United States Patent
Yang

(10) Patent No.: US 8,253,599 B2
(45) Date of Patent: Aug. 28, 2012

(54) PORTABLE ELECTRONIC DEVICE AND MOVEMENT SENSOR THEREOF

(75) Inventor: Song-Ling Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 440 days.

(21) Appl. No.: 12/691,742

(22) Filed: Jan. 22, 2010

(65) Prior Publication Data
US 2010/0225505 A1 Sep. 9, 2010

(30) Foreign Application Priority Data
Mar. 5, 2009 (CN) .......................... 2009 1 0300699

(51) Int. Cl.
*H03K 17/94* (2006.01)

(52) U.S. Cl. .......................................... 341/22; 341/20

(58) Field of Classification Search ................ 341/20, 341/22
See application file for complete search history.

(56) References Cited

U.S. PATENT DOCUMENTS

| 7,663,483 B2 * | 2/2010 | Spenik et al. ................. 340/547 |
| 2005/0035836 A1 * | 2/2005 | Howard et al. ............... 335/205 |

\* cited by examiner

*Primary Examiner* — Khai M Nguyen
(74) *Attorney, Agent, or Firm* — Altis Law Group, Inc.

(57) ABSTRACT

The disclosure provides a portable electronic device. The portable electronic device includes a movement sensor and a processing module. The movement sensor is configured for sensing a movement of the portable electronic device and generating electrical signals in response to the movement. The movement sensor further includes a metal assembly and a magnetic assembly. When the portable electronic device has a movement, the metal assembly moves relative to the magnetic assembly to cut lines of magnetic force, therefore the metal assembly generates the electrical signals. The processing module performs predetermined operations according to the electrical signals.

16 Claims, 5 Drawing Sheets

PORTABLE ELECTRONIC DEVICE AND MOVEMENT SENSOR THEREOF

BACKGROUND

1. Technical Field

The disclosure relates to electronic devices and, more particularly, to a portable electronic device including a movement sensor.

2. Description of the Related Art

Electronic apparatuses, such as mobile phones, may utilize keys for receiving user inputs. Therefore, when a user wants to use the mobile phone, he or she has to press one or more keys. For example, when the mobile phone is locked, to use the mobile phone, the user generally needs to manually and quickly press several keys, e.g. an unlock key and a symbol "*" key, to unlock the mobile phone. It is complex and inconvenient for the user to press multiple keys of the conventional mobile phone to perform a function.

BRIEF DESCRIPTION OF THE DRAWINGS

The components in the drawings are not necessarily drawn to scale, the emphasis instead being placed upon clearly illustrating the principles of the portable electronic device. Moreover, in the drawings, like reference numerals designate corresponding parts throughout the several views.

DETAILED DESCRIPTION

Figure 1:
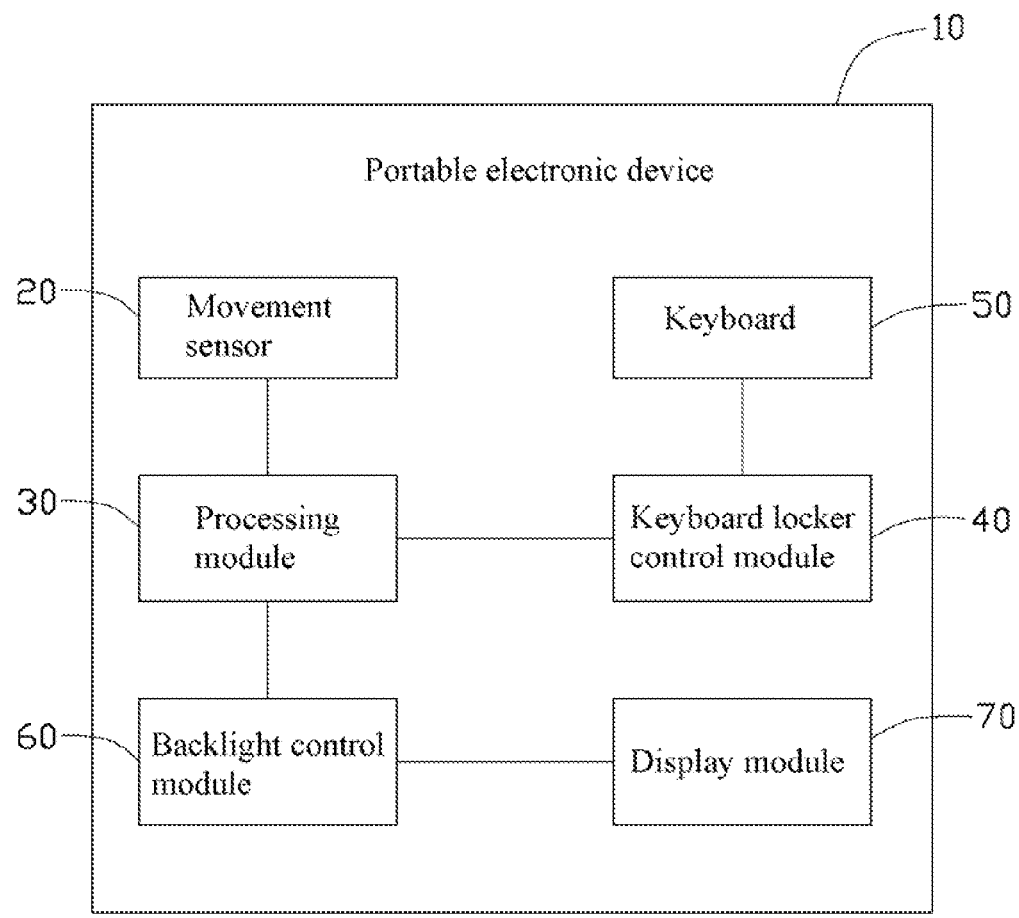
FIG. 1 is a block diagram of a portable electronic device in accordance with an embodiment.

FIG. 1 is a block diagram of a portable electronic device in accordance with an embodiment. The portable electronic device 10 can be a mobile phone, a personal digital assistant (PDA), a game player, etc. The portable electronic device 10 includes a movement sensor 20, a processing module 30, a keyboard locker control module 40, a keyboard 50, a backlight control module 60, and a display module 70. The movement sensor 20 is configured for sensing movements of the portable electronic device 10 and generating electrical signals in response to the movements.

The processing module 30, which may include one or more processors, is configured for receiving the electrical signals and performing a plurality of predetermined operations according to the electrical signals. For example, when receiving an electrical signal, the processing module 30 compares a value of the electrical signal with a predetermined value, and when the value of the electrical signal is greater than the predetermined value, the processing module 30 performs the predetermined operation to control the keyboard locker control module 40 and the backlight control module 60, in other examples the processing module 30 may look for matching signals associated with certain commands or functions. The predetermined value can be a voltage value or a current value. The keyboard locker control module 40 is configured for activating the keyboard 50 under the control of the processing module 30. The backlight control module 60 is configured for turning on backlight of the portable electronic device 10 under the control of the processing module 30.

Figure 2:
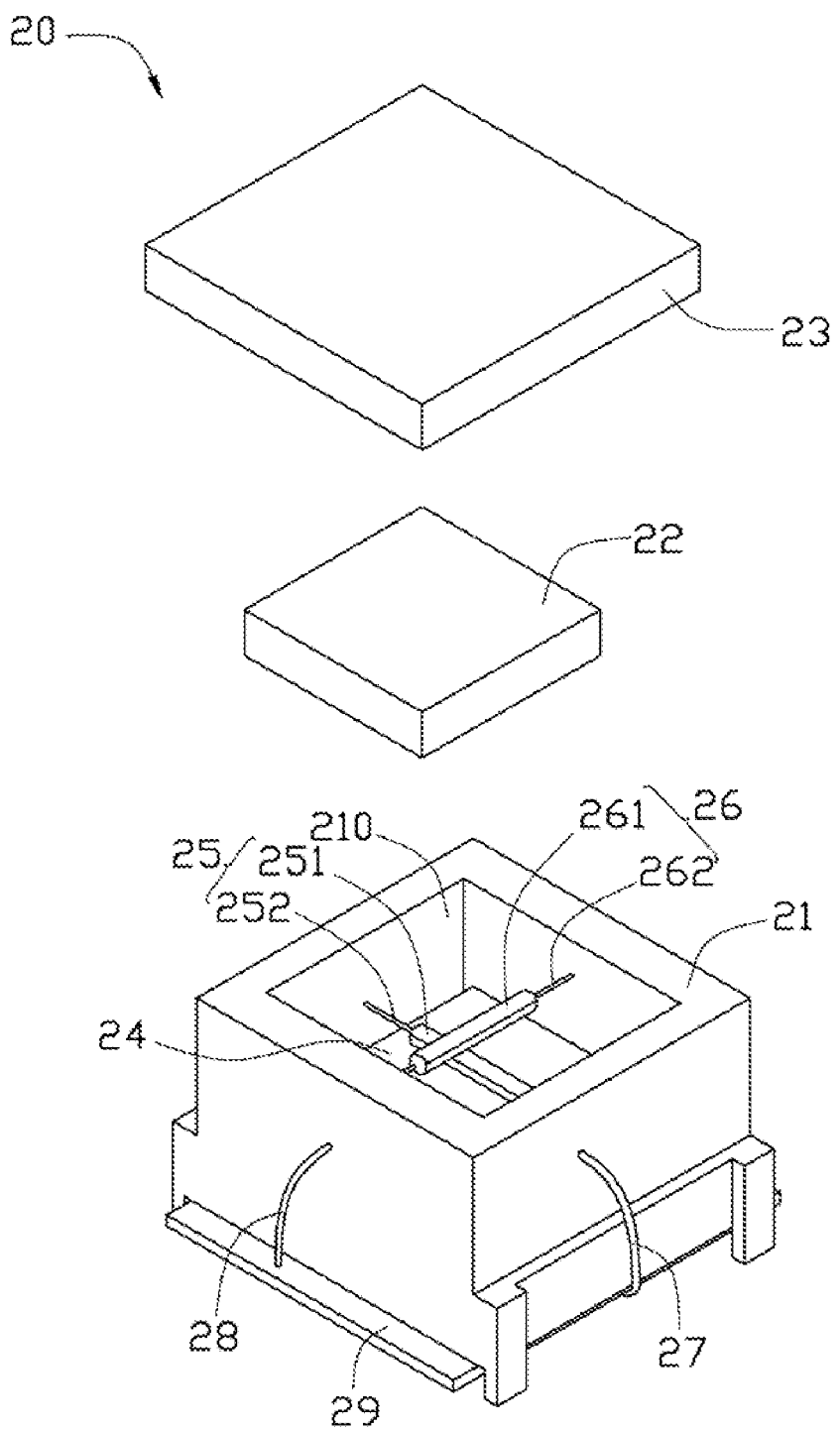
FIG. 2 is a perspective view of a movement sensor of the portable electronic device of FIG. 1, in accordance with an embodiment.
Figure 3:
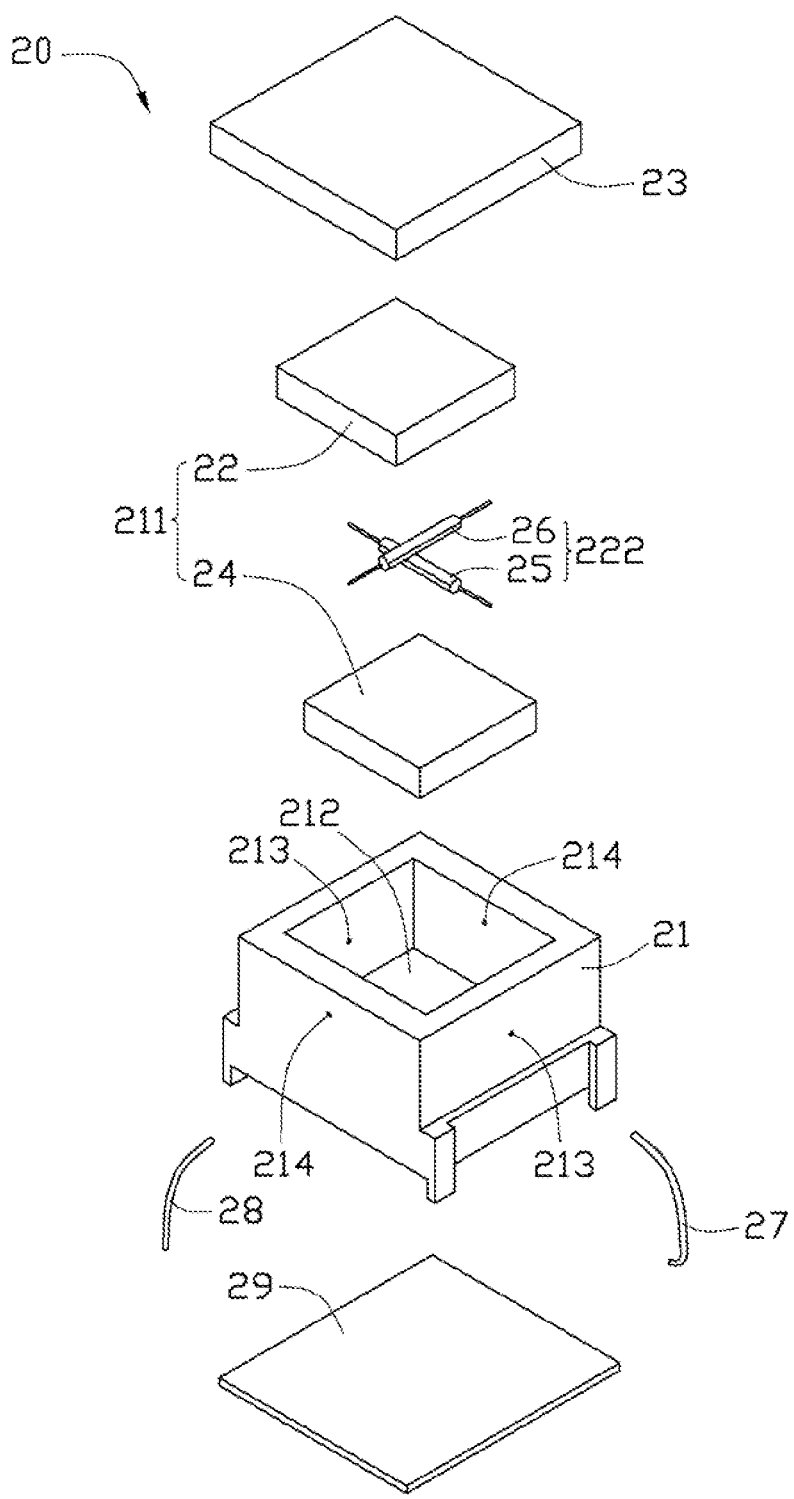
FIG. 3 is a exploded view of the movement sensor shown in FIG. 2.
Figure 4:
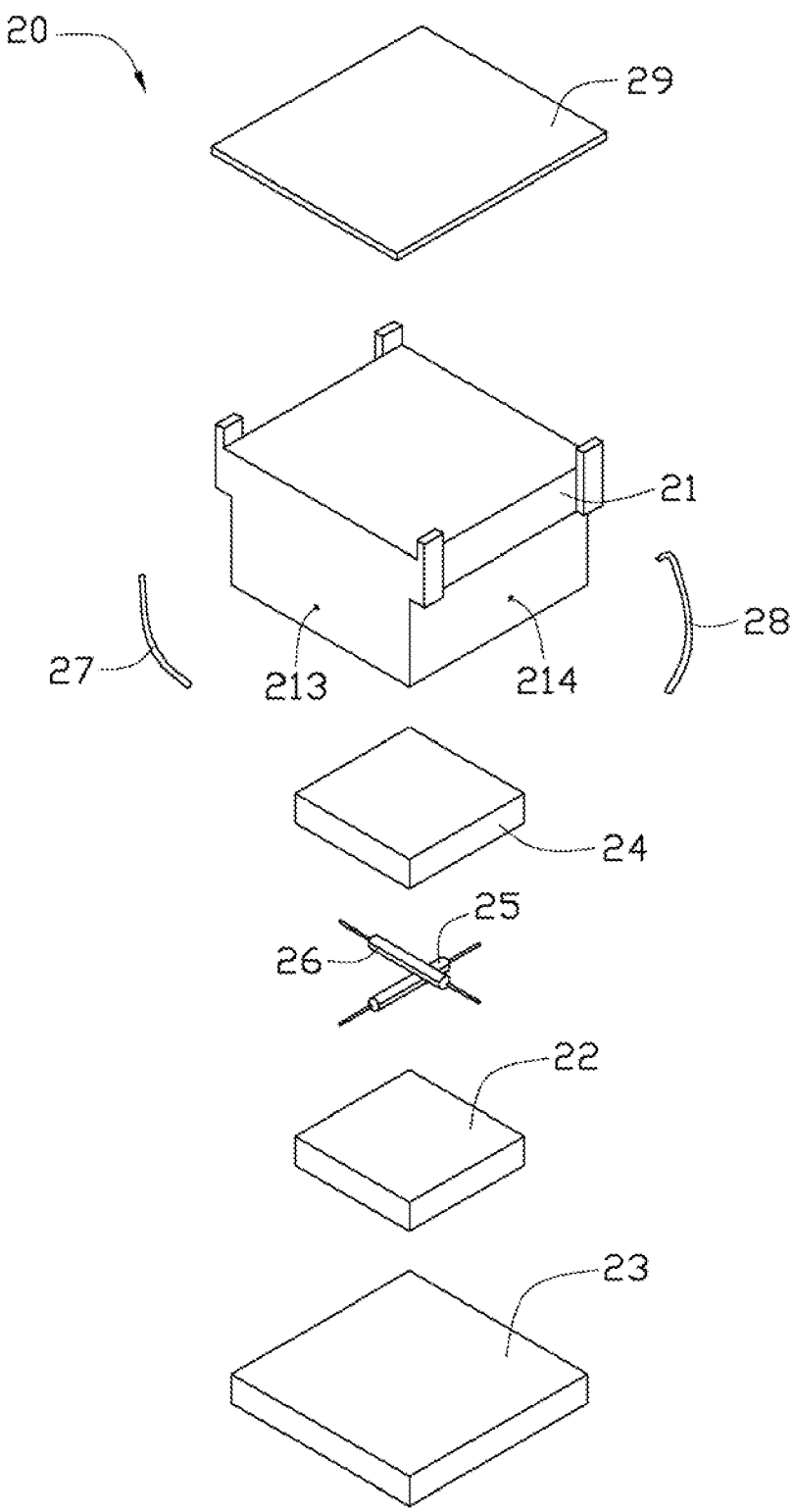
FIG. 4 is similar to FIG. 3, but viewed from another aspect.

Referring to FIGS. 2-4, the movement sensor 20 includes a receiving assembly 21, a cover 23, a magnetic assembly 211, a metal assembly 222, a first electrical line 27, a second electrical line 28, and a signal-processing unit 29. In this embodiment, the magnetic assembly 211 further includes a first magnet 22 and a second magnet 24, and the metal assembly 222 further includes a first metal element 25 and a second metal element 26. The receiving assembly 21 may be made of plastic material and defines an accommodating space 210. The accommodating space 210 accommodates the first magnet 22, the second magnet 24, the first metal element 25, and the second metal element 26. The first metal element 25 and the second metal element 26 are positioned between the first magnet 22 and the second magnet 24. The polarities of a bottom of the first magnet 22 and a top of the second magnet 24 are opposite, and a magnetic field is formed between the first magnet 22 and the second magnet 24.

The cover 23 covers the accommodating space 210. The signal-processing unit 29 is positioned under a bottom of the receiving assembly 21. In this embodiment, the first magnet 22 is positioned between the cover 23 and the second magnet 24, and the second magnet 24 is positioned on the bottom 212 of the accommodating space 210.

Both the metal elements 25 and 26 are bars and intersect each other in the accommodating space 210. In this embodiment, the first magnet 22 and the second magnet 24 are parallel to each other and lines of magnetic force between the first magnet 22 and the second magnet 24 are vertical with the first magnet 22 or the second magnet 24. Therefore, the first metal element 25 and the second metal element 26 move together relative to the first magnet 22 and the second magnet 24 to cut the lines of magnetic force, and generate the electrical signals.

The first metal element 25 includes a metal bar portion 251 and an electrical elastic portion 252 connected to the metal bar portion 251. The metal bar portion 251 may be made of non-ferrous metal material, which the first magnet 22 cannot attract, such as copper. The electrical elastic portion 252 is a metal spring or a metal elastic bar. The electrical elastic portion 252 is connected to the metal bar portion 251 electrically, and two ends of the electrical elastic portion 252 are positioned in two holes 213 of one couple of opposing sidewalls of the accommodating space 210. One end of the electrical elastic portion 252 is connected to the signal-processing unit 29 by the first electrical line 27 through one hole 213.

The second metal element 26 includes a metal bar portion 261 and an electrical elastic portion 262 connected to the metal bar portion 261. The metal bar portion 261 may be made of metal material, which the second magnet 24 cannot attract, such as copper. The electrical elastic portion 262 is a metal spring or a metal elastic bar. The electrical elastic portion 262 is connected to the metal bar portion 261 electrically, and two ends of the electrical elastic portion 262 are positioned in two holes 214 of the other couple of opposing sidewalls of the accommodating space 210. One end of the electrical elastic portion 262 is connected to the signal-processing unit 29 by the second electrical line 28 through one hole 214.

Figure 5:
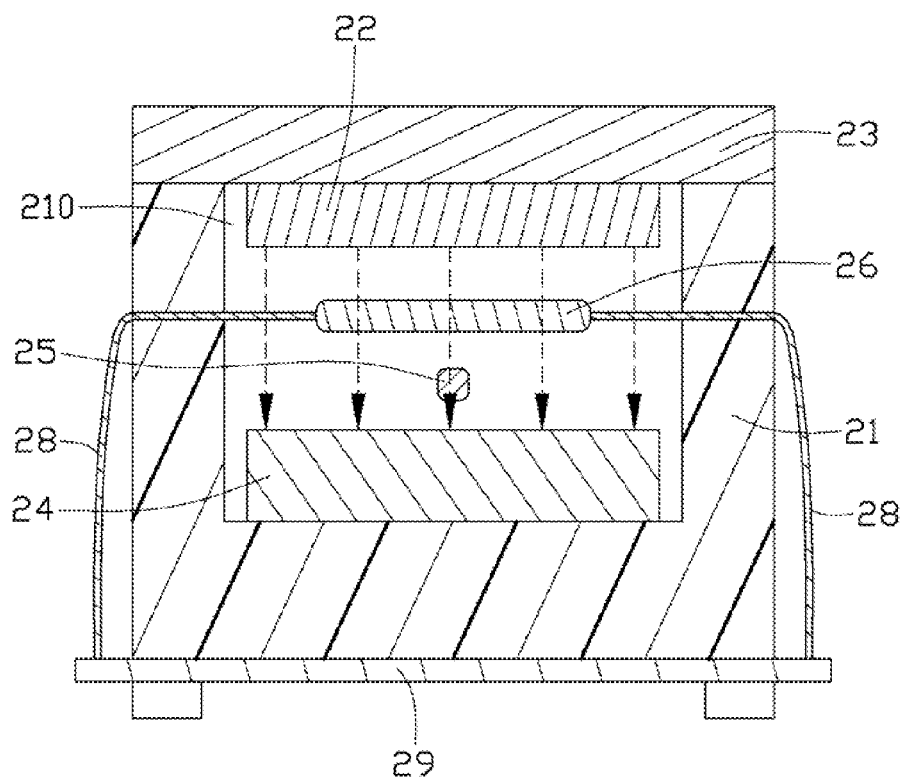
FIG. 5 is a cross-sectional view enlarging a portion of the movement sensor shown in FIG. 2.

As shown in FIG. 5, when the user shakes the portable electronic device 10, the receiving assembly 21 moves, but the metal bar portion 251 and the electrical elastic portion 252, for example, do not move at once due to the inertia of the metal bar portion 251 and the electrical elastic portion 252, and thus the electrical elastic portion 252 is deformed to generate a first elastic force. The metal bar portion 251 then moves relative to the first magnet 22 and the second magnet 24 to cut the lines of magnetic force and generates a first electrical signal according to the first elastic force.

At the same time, when the receiving assembly 21 moves, but the metal bar portion 261 and the electrical elastic portion 262 do not move at once due to the inertia of the metal bar portion 261 and the electrical elastic portion 262, and thus the electrical elastic portion 262 is deformed to generate a second elastic force. The metal bar portion 261 then moves relative to the first magnet 22 and the second magnet 24 to cut the lines of magnetic force and generates a second electrical signal according to the second elastic force.

The signal-processing unit 29 receives the first electrical signal and the second electrical signal, filtrates and amplifies the two electrical signals, and transmits the amplified electrical signals to the processing module 30. The processing module 30 generates a first execution signal according to the amplified first electrical signal, and generates a second execution signal according to the amplified second electrical signal. The keyboard locker control module 40 activates the keyboard 50 according to the first execution signal. The backlight module 60 controls the display module 70 to turn on the backlight of the portable electronic device 10 according to the second execution signal. The operations performed by the processing module 30 are not limited to the description described herein, they can be other operations, such as playing a song, increasing or decreasing the volume of the song, and so on.

In another embodiment, the first and the second metal elements 25, 26 can be replaced by a "U" shape magnet, and the first and the second magnets 22, 24 move relative to the "U" shape magnet to generate the electrical signals.

When the user shakes the portable electronic device 10, the first and the second metal elements 25, 26 of the movement sensor 20 cut the lines of magnetic force between the first and the second magnets 22, 24 to generate the electrical signals. The processing module 30 controls the keyboard locker control module 40 to activate the keyboard 50 and controls the backlight control module 60 to turn on the backlight according to the electrical signals. The user does not need to press any key to activate the keyboard 50.

It is understood that the disclosure may be embodied in other forms without departing from the spirit thereof. Thus, the present examples and embodiments are to be considered in all respects as illustrative and not restrictive, and the disclosure is not to be limited to the details given herein.

What is claimed is:

1. A portable electronic device comprising:
   a movement sensor, comprising a metal assembly and a magnetic assembly, and configured for sensing a movement of the portable electronic device to generate electrical signals,
      wherein when the portable electronic device has a movement, the metal assembly moves relative to the magnetic assembly to cut lines of magnetic force generated from the magnetic assembly and generates the electrical signals; and
   a processing module configured for performing predetermined operations according to the electrical signals.

2. The portable electronic device as recited in claim 1, wherein the movement sensor further comprises a receiving assembly defining an accommodating space, the accommodating space accommodates the metal assembly and the magnetic assembly.

3. The portable electronic device as recited in claim 2, wherein the magnetic assembly comprises two magnets, the polarities of a bottom of one magnet and a top of the other are opposite and a magnetic field is formed between the two magnets, and the metal assembly is positioned between the two magnets.

4. The portable electronic device as recited in claim 3, wherein the movement sensor further comprises a signal-processing unit positioned under a bottom of the receiving assembly, and the signal-processing unit is configured for receiving the electrical signals, filtrating and amplifying the electrical signals, and transmitting the amplified electrical signals to the processing module.

5. The portable electronic device as recited in claim 4, wherein the metal assembly further comprises two metal elements, each metal element comprises a metal bar portion and an electrical elastic portion, the electrical elastic portion is connected to the metal bar portion electrically, two ends of the electrical elastic portion are positioned on one couple of opposing sidewalls of the accommodating space, and one end of the electrical elastic portion is connected to the signal-processing unit by an electrical line.

6. The portable electronic device as recited in claim 5, wherein the two metal elements intersect each other in the accommodating space.

7. The portable electronic device as recited in claim 1, further comprising a keyboard locker control module, a keyboard, a backlight control module, and a display module, wherein the processing module performs the predetermined operation to control the keyboard locker control module to activate the keyboard, and to control the backlight control module to turn on backlight of the portable electronic device.

8. The portable electronic device as recited in claim 7, wherein when receiving an electrical signal, the processing module compares a value of the electrical signal with a predetermined value, and when the value of the electrical signal is greater than the predetermined value, the processing module performs the predetermined operation to control the keyboard locker control module and the backlight control module.

9. The portable electronic device as recited in claim 8, wherein the predetermined value is a voltage value or a current value.

10. A movement sensor for sensing a movement of a portable electronic device and generating electrical signals, comprising:
    a metal assembly and;
    a magnetic assembly;
    wherein when the portable electronic device has a movement, the metal assembly moves relative to the magnetic assembly to cut lines of magnetic force generated from the magnetic assembly and generates the electrical signals.

11. The movement sensor as recited in claim 10, further comprising a receiving assembly defining an accommodating space, wherein the accommodating space accommodates the metal assembly and the magnetic assembly.

12. The movement sensor as recited in claim 11, wherein the magnetic assembly comprises two magnets, the polarities of a bottom of one magnet and a top of the other are opposite and a magnetic field is formed between the two magnets, and the metal assembly is positioned between the two magnets.

13. The movement sensor as recited in claim 12, further comprising a signal-processing unit positioned under a bottom of the receiving assembly configured for receiving the electrical signals, filtrating and amplifying the electrical signals, and transmitting the amplified electrical signals to the portable electronic device.

14. The movement sensor as recited in claim 13, wherein the metal assembly further comprises two metal elements, each metal element comprises a metal bar portion and an electrical elastic portion, the electrical elastic portion is connected to the metal bar portion electrically, two ends of the electrical elastic portion are positioned on one couple of opposing sidewalls of the accommodating space, and one end of the electrical elastic portion is connected to the signal-processing unit by an electrical line.

15. The movement sensor as recited in claim 14, wherein the two metal elements intersect each other in the accommodating space.

16. The movement sensor as recited in claim 14, wherein each metal bar portion is made of copper and each electrical elastic portion is a metal spring or a metal elastic bar.

* * * * *